United States Patent [19]

Hosomizu et al.

[11] 4,199,242

[45] Apr. 22, 1980

[54] OPERATION CONTROL CIRCUITRY FOR ELECTRONIC FLASH DEVICES

[75] Inventors: Hiroshi Hosomizu, Osaka; Yoshiharu Ohta, Izumi, both of Japan

[73] Assignee: Minolta Camera Kabushiki Kaisha, Osaka, Japan

[21] Appl. No.: 945,789

[22] Filed: Sep. 25, 1978

[30] Foreign Application Priority Data

Sep. 30, 1977 [JP] Japan .................. 52-118412

[51] Int. Cl.² .............................................. G03B 15/03
[52] U.S. Cl. .................................. 354/145; 354/105; 354/109
[58] Field of Search ................... 354/105, 109, 145

[56] References Cited

U.S. PATENT DOCUMENTS

| | | | |
|---|---|---|---|
| 3,889,281 | 6/1975 | Taguchi et al. | 354/109 |
| 3,971,049 | 7/1976 | Ohmuri et al. | 354/105 |
| 4,112,444 | 9/1978 | Yonemoto et al. | 354/145 |
| 4,130,780 | 12/1978 | Ban et al. | 354/145 |

FOREIGN PATENT DOCUMENTS

51-103426  9/1976  Japan .

*Primary Examiner*—Russell E. Adams
*Attorney, Agent, or Firm*—Watson, Cole, Grindle & Watson

[57] ABSTRACT

In a system where a single power source battery is commonly used for the oscillation circuit of an electronic flash device and for another circuit, such as a control circuit for energizing a light source for a data recording for a given period of time, the operation of the oscillation circuit is interrupted by a semiconductor switching device in response to a firing of the flash tube of the flash device. The oscillation circuit interruption continues for a predetermined period during which the aforesaid another circuit is operated from the battery. To this end, the semiconductor switch may be controlled by a delay circuit.

10 Claims, 3 Drawing Figures

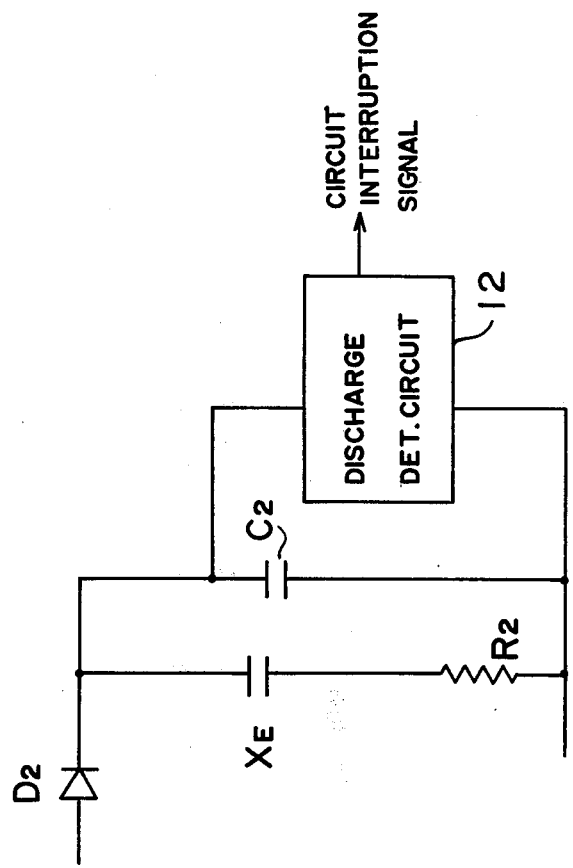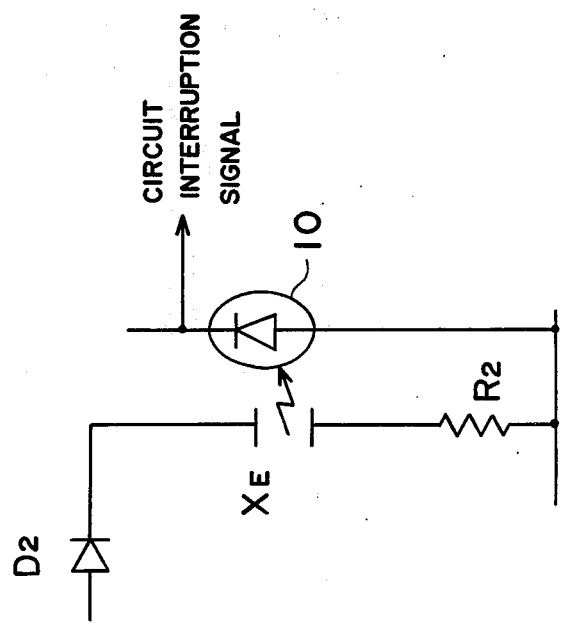

OPERATION CONTROL CIRCUITRY FOR ELECTRONIC FLASH DEVICES

BACKGROUND OF THE INVENTION

The present invention relates to an electronic flash device operated from a power source that is also used for a camera data recording circuit.

In a camera data recording circuit, the light source for data recording is adapted to be lit for a given time period while the camera exposure operation is performed. If the power source of the data recording circuit is also used for the electronic flash device, the terminal voltage of the power source battery varies greatly with the operation of the oscillation circuit or DC-DC converter for obtaining high voltage in the electronic flash device, so that in the data recording circuit the time and the quantity of the light for data recording will be unstable. Especially if the commencement of the operation of the data recording circuit is coincident with the time when the terminal voltage of the power source battery is very low due to the above change of the power source battery terminal voltage, the data recording circuit is not likely to be able to initiate operation of the data recording.

SUMMARY OF THE INVENTION

The object of the present invention is to provide a power supply control circuit wherein power is supplied from a common power source battery to both the electronic flash circuit and the data recording circuit, but which avoids the above mentioned problems.

Generally in electronic flash devices, the oscillating output produced by the oscillation of a boosting oscillator is boosted by a transformer to obtain a high voltage AC output which is rectified by a diode. The resultant current is then supplied to the main capacitor to charge it. The discharge current of the main capacitor energizes and fires a flash discharge tube. The above-mentioned drop or pulsation of the terminal voltage of the power source battery is caused by the oscillation of the boosting oscillator. Therefore, in order to attain the above object of the present invention, the oscillation of the boosting oscillator circuit is temporarily interrupted or reduced to substantially zero for a given time period from the flash firing in response to the detection of the flash firing caused by the operation of the electronic flash device. The data recording is initiated in connection with the shutter operation after the completion of an exposure, with the flash firing being finished before the exposure is completed. Thus the data recording circuit is powered by a stable power supply without being affected by the oscillation circuit.

According to the present invention, the oscillation of the electronic flash boosting oscillator circuit is interrupted or greatly suppressed so that a stable power supply sufficient for stable data recording can be provided even if a power source for the electronic flash device is used in common for the data recording circuit.

BRIEF DESCRIPTION OF THE FIGURES

FIGS. 2A and 2B show modifications of the embodiment of FIG. 1 and in particular modified means for generating respective circuit interruption signals.

DETAILED DESCRIPTION OF THE PREFERRED EMBODIMENT

Figure 1:
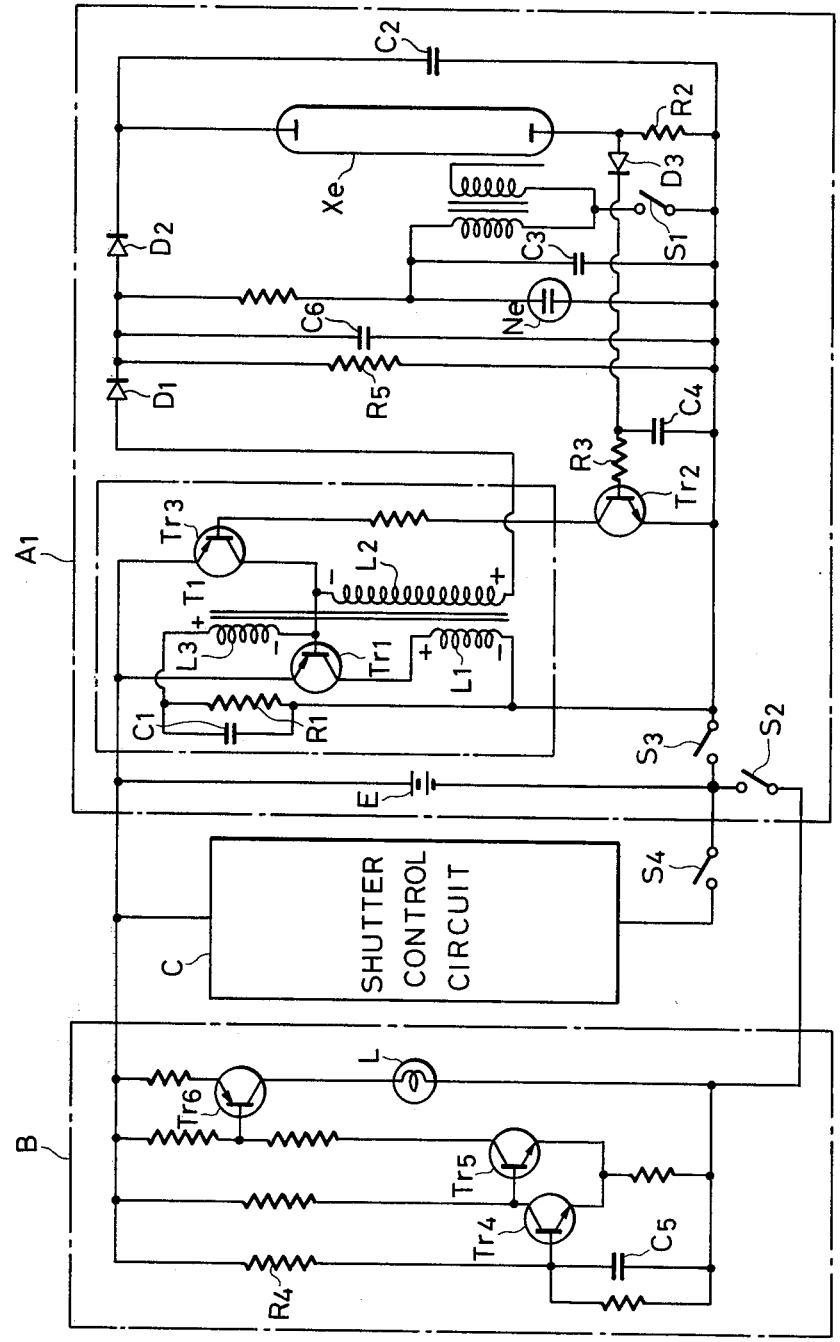
FIG. 1 is a schematic circuit diagram showing an electric circuit according to one embodiment of the present invention.

In FIG. 1, electronic flash circuit A, data recording circuit B, and electric shutter circuit C are supplied with electric power by common power source E. The boosting oscillator circuit F (indicated by the chain line within electronic flash circuit A) includes a blocking oscillator comprising primary winding L1 and back coupling winding L3 of boosting transformer T1, transistor Tr1, capacitor C1, and resistor R1. Upon usage of the electronic flash, main switch S3 is closed, then transistor Tr1 is made conductive, since the base of transistor Tr1 is at first connected to the negative pole of power source E through back coupling winding L3 of transformer T1 and resistor R1. Once collector current begins to flow in transistor Tr1, induced electromotive forces with the polarity shown in the circuit diagram are generated in respective windings L1, L2, and L3 of transformer T1, and the bias of transistor Tr1 increases in a direction to make that transistor more conductive until saturating the collector current of transistor Tr1. During the above operations, capacitor C1 is sufficiently charged for its upper terminal to be made positive. But the saturation of transistor Tr1 causes the induced electromotive force of each winding to be zero, and then the base of transistor Tr1 is biased in the positive direction to make it non-conductive. As a result, capacitor C1 is discharged through resistor R1 and the base of transistor Tr1 is biased again in the negative direction in due time. Thus, one cycle of the oscillation is completed and transistor Tr1 is made conductive again for the repetition of the above operations. Transistor Tr3 is non-conductive during the above operations. The high voltage generated in secondary winding L2 of transformer T1 in response to the above operation of the blocking oscillator circuit is rectified by means of diodes D1, D2, and main capacitor C2 is charged therewith. When capacitor C2 is sufficiently charged for flash firing, the charge completion is indicated by the lighting of neon tube Ne. The closure of synchronizing switch S1, in response to the full opening of the shutter, triggers the discharge of flash discharge tube Xe.

In the conductive state of transistor Tr1 during the oscillation of booster circuit F, a current equivalent to the forward current gain of transistor Tr1 flows in the collector thereof so that the terminal voltage of power source E is considerably lowered. Therefore, the terminal voltage of data recording circuit B varies greatly depending on the relationship between the lighting period of the data recording light source and the phase of the oscillation of the booster circuit so that instability with respect to the operations of data recording circuit B are caused, unless the countermeasures described hereinafter are taken.

Switch S4 is a power switch for the electric shutter circuit and is adapted to be closed in response to the depression of the camera shutter release button, resulting in the energization of the electric shutter circuit. When the shutter is fully opened, synchronizing switch S1 is closed and flash discharge tube Xe is fired. The lighting of the flash discharge tube causes discharge current to flow through resistor R2 having a small resistance. Then the potential of resistor R2 is slightly raised and capacitor C4 is charged through diode D3. Meanwhile base current flows in transistor Tr2 through resistor R3, and transistor Tr2 conducts to make transistor Tr3 conductive.

As transistor Tr3 has its collector and emitter connected between the base and emitter of transistor Tr1, transistor Tr1 is short-circuited by the conduction of transistor Tr3, causing the oscillator circuit to cease oscillating. Transistor Tr3 may be made conductive to an extent for the oscillator circuit oscillation to be considerably suppressed even if transistor Tr1 is not completely turned off. The interruption or suppression of the oscillation of the boosting oscillator circuit continues after the discharge of flash discharge tube Xe is completed and until transistor Tr2 is blocked as a result of the discharge of capacitor C4 through resistor R3 and the base of transistor Tr2. The capacity of capacitor C4 and the resistance of resistor R3 are chosen so that the duration of the above state with respect to the boosting oscillator circuit is equal to, or a little longer than, the time required for data recording.

Switch S2 is also closed in conjunction with the closure of switch S1. When switch S2 is closed, data recording circuit B is energized during the period when the oscillation of the oscillator circuit is interrupted or suppressed. Immediately after the closure of switch S2, as the charging voltage of capacitor C5 is zero at that time, transistor Tr4 of a switching circuit, also including transistor Tr5, is non-conductive with the other transistor Tr5 being conductive, and consequently Tr6 is conductive so that light source lamp L for data recording is energized. Capacitor C5 is charged through resistor R4 to a given voltage in time for the exposure of a date recording, thereby making transistor Tr4 conductive, and transistor Tr6 non-conductive to turn off lamp L. After the completion of data recording, transistor Tr2 is made non-conductive and the normal oscillation of the boosting oscillator circuit is restored, since the time required for capacitor C4 to be discharged to a level for making transistor Tr2 non-conductive is arranged to be equal to, or a little longer than, the lighting period of lamp L.

In electronic flash circuit A, resistor R5 is adapted for discharging trigger capacitor C3 so that the triggering of flash discharge tube Xe is prevented to, in turn, prevent flash photography. Otherwise, the triggering is caused because main capacitor C2 maintains an electric charge even after switch S3 is opened. Smoothing capacitor C6 stabilizes the lighting voltage of neon tube Ne for the indication of the charge completion, thereby ensuring the accuracy of such indication.

The aforedescribed embodiment of the invention, and in particular the flash firing signal for interrupting the oscillator circuit, may be modified, for example, as follows. As shown in FIG. 2A, a photoresponsive element 10 such as a photocell, photoresistor, phototransistor, photodiode, or the like, may be provided to receive the flash light either directly or indirectly to provide an output for interrupting the oscillator circuit. Alternatively, as shown in FIG. 2B, the voltage drop of the main capacitor may be detected upon flash firing and a detection signal generated by discharge detection circuit 12 and used for controlling the operation of the interruption means.

Techniques for obtaining flash firing signals as a means for actuating automatic flash duration control circuitry in response to flash firing are well known in the art (reference U.S. Pat. No. 4,021,698 assigned to the same Assignee as the present invention, and U.S. Pat. Nos. 3,517,255, 3,519,879 and Reissue Pat. No. 26,999 cited therein). Such prior art teachings are incorporated herein by reference with respect to the modifications shown in FIGS. 2A and 2B.

It is also readily apparent to those skilled in the art that the invention has application to the prevention of instability of camera circuits other than data recording circuits. For example, flash firing may also adversely affect the operation of automatic shutter control circuits, automatic focus control circuits, and motor driving circuits for film advancing and shutter cocking.

What is claimed is:

1. In a photographic camera system including an electronic flash device having a flash tube, means for energizing the flash tube and means for generating a high voltage for charging said means for energizing, a power source battery for energizing said means for generating, and circuit means energized by the power source battery, the combination comprising:
   means for interrupting the operation of said means for generating for a time interval;
   means for actuating said interrupting means in response to the firing of said flash tube; and
   timing means for controlling the duration of said time interval.

2. The camera system as claimed in claim 1 wherein said interrupting means includes semiconductor switching means responsive to said means for actuating to become non-operative in response to the flash firing.

3. The camera system as claimed in claim 2 wherein said timing means includes delay means for setting said time interval and operating said semiconductor switching means after the expiration of said time interval.

4. The camera system as claimed in claim 1 wherein said means for generating is an oscillation circuit including a transformer having a plurality of coils and an oscillation transistor controlled by said plurality of coils, and said interrupting means includes first semiconductor means shunted across the base emitter of said oscillation transistor.

5. The camera system as in claim 4 wherein said actuating means includes photoresponsive means responsive to the energization of said flash tube for generating a signal to control the actuation of said interrupting means.

6. The camera system as in claim 4 wherein said actuating means includes means for sensing the operation of said means for energizing and generating a signal to control the actuation of said interrupting means.

7. The camera system as claimed in claim 4 wherein said actuating means includes an impedance member connected with said flash tube for generating a voltage in accordance with the current flowing through the impedance member upon flash firing, said interrupting means being responsive to said voltage.

8. The camera system as claimed in claim 7 wherein said interrupting means includes second semiconductor means coupled with said first semiconductor means and having a control electrode connected to said impedance member so that said first semiconductor means is made conductive in response to the generation of said voltage.

9. The camera system as claimed in claim 8 wherein said delay means includes a capacitor and a resistor coupled with said second semiconductor means for blocking said first semiconductor means after the expiration of said time interval.

10. The camera system as claimed in claim 3 or 8 wherein said circuit means includes a light source for illuminating data to be recorded, and a control circuit for energizing said light source for a predetermined time period.

* * * * *